Patented Aug. 17, 1948

2,447,332

UNITED STATES PATENT OFFICE 2,447,332

TRIMETHINE CYANINE DYES

Frances M. Hamer and Edward B. Knott, Wealdstone, England, assignors to Eastman Kodak Company, Rochester, N. Y., a corporation of New Jersey No Drawing. Application May 4, 1945, Serial No. 592,070. In Great Britain May 18, 1944

5 Claims. (Cl. 260—240)

This invention relates to trimethine cyanine dyes and to a process for the preparation thereof, as well as to photographic emulsions sensitized therewith.

Trimethine cyanine dyes containing α-naphthothiazole nuclei substituted in the 8-position (using numbering system of Chemical Abstracts) with an alkoxyl group are known. However, trimethine cyanine dyes containing β-naphthothiazole nuclei substituted in any position with alkoxyl groups were not heretofore available. We have now provided new trimethine cyanine dyes containing 5-alkoxy-β-naphthothiazole nuclei which can also be called 4'-alkoxynaphtha-1',2',4,5-thiazole nuclei. The latter numbering system will be employed herein. This system is illustrated in the following formula:

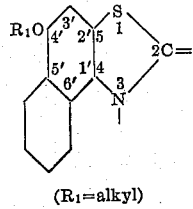

(R₁=alkyl)

It is accordingly an object of our invention to provide new trimethine cyanine dyes. A further object is to provide a process for preparing the same. A still further object is to provide photographic emulsions spectrally sensitized with such dyes. Other objects will become apparent hereinafter.

Our invention also includes trimethine cyanine dyes containing 4-alkoxythionaphthene-7',6',4,5-thiazole nuclei which have the following formula:

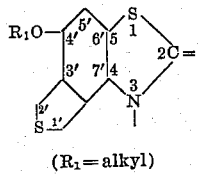

(R₁=alkyl)

The trimethine cyanine dyes of our invention can be represented by the following general formula:

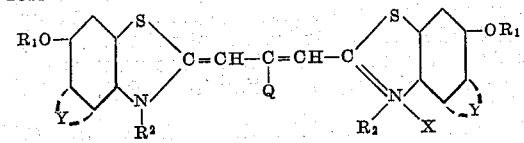

wherein $R_1$ represents an alkyl group, $R_2$ represents a member selected from the group consisting of alkyl and aralkyl groups, Q represents a member selected from the group consisting of a hydrogen atom and an alkyl group, Y represents the non-metallic atoms necessary to complete a ring selected from the group consisting of benzene and thiophene rings, and X represents an anion. More specifically $R_1$ represents methyl, ethyl, n-propyl, isopropyl, n-butyl, isobutyl, etc., $R_2$ represents methyl, ethyl, n-propyl, isopropyl, n-butyl, isobutyl, benzyl, etc. Q represents methyl, ethyl, n-propyl, isopropyl, n-butyl, isobutyl, etc. X represents a halide anion, a perchlorate anion, an alkylsulfate anion, a p-toluenesulfonate anion, etc.

In accordance with our invention, we prepare the above-formulated dyes by condensing an ester of an orthocarboxylic acid with a cyclammonium quaternary salt of the following general formula:

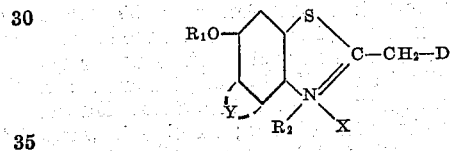

wherein D represents a hydrogen atom or an alkyl group, $R_1$ represents an alkyl group, $R_2$ represents an alkyl or aralkyl group, X represents an anion and Y represents the non-metallic atoms necessary to complete a benzene or thiophene ring. Typical esters of orthocarboxylic acids are: the trialkyl orthocarboxylic esters, such as, ethyl orthoformate, methyl orthoacetate, ethyl orthopropionate, etc.

The condensations are advantageously effected in the presence of an acid-binding agent, e. g. a tertiary amine, such as triethylamine, dimethylaniline, N-methylpiperidine or pyridine. Alcoholic reaction media can be employed, e. g. methyl, ethyl, propyl, isopropyl or the butyl alcohols. Alkali metal salts of weak inorganic acids, e. g. potassium carbonate or trisodium phosphate can also be employed as acid-binding agents.

The following examples will serve to illustrate further the manner of practicing our invention.

*Example 1.—Bis-(4'-methoxy-3-methylnaphtha-1':2':4:5-thiazole) β-ethyltrimethincyanine bromide*

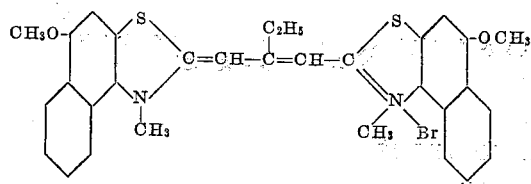

4'-methoxy-2-methylnaphtha-1':2':4:5-thiazole metho-p-toluenesulphonate (6.21 g.; 2 mols.), ethyl orthopropionate (4.5 cc.; 3 mols.), and pyridine (50 cc.) were heated together under reflux in an oilbath at 145° to 155° for an hour. The resultant liquid was poured hot into a hot solution of ammonium bromide (5.86 g.; 8 mols.) in water (100 cc.). The product was filtered off when cold, washed with water, ground with acetone, and extracted with ether in a Soxhlet apparatus to remove yellow by-product. The undissolved residue was boiled out with and recrystallized from methyl alcohol. The green crystals gave a bluish purple solution in alcohol.

*Example 2.—Bis-(4'-methoxy-3-ethylnaphtha-1':2':4:5-thiazole) β-methyltrimethincyanine chloride*

4'-methoxy-2-methylnaphtha-1':2':4:5-thiazole etho-p-toluenesulfate (3.13 g.; 2 mols.), ethyl orthoacetate (1.9 cc.; 3 mols.), and pyridine (15 cc.) were heated together under reflux in an oilbath at 145° to 155° for an hour. On pouring the hot liquid into a hot solution of ammonium chloride (1.6 g.; 8 mols.) in water (30 cc.), solid separated. It was filtered off when cold, washed with water, and ground with acetone. The undissolved residue was boiled out with, and recrystallized from absolute ethyl alcohol. The bluish green crystals gave a bluish purple solution in alcohol.

*Example 3.—Bis-(4'-methoxy-3:6'-dimethylnaphtha-1':2':4:5-thiazole) β-ethyltrimethincyanine bromide*

4'-methoxy-2:6'-dimethylnaphtha-1':2':4:5-thiazole metho-p-toluenesulfonate (8.59 g.; 2 mols.), ethyl orthopropionate (6 cc.; 3 mols.) and pyridine (20 cc.) were heated together under reflux in an oilbath at 145° to 155° for an hour. The hot liquid was poured out into a hot solution of ammonium bromide (7.84 g.; 8 mols.) in water (40 cc.). The solid which separated was filtered off when cold, washed with water, and ground with acetone. It was then extracted with ether in a Soxhlet apparatus until no more yellow by-product was being removed by the solvent. The undissolved residue was boiled out with methyl alcohol and then recrystallized from methyl alcohol. The dull green crystals gave an alcoholic solution which was bluish purple to transmitted light and red to reflected light.

*Example 4.—Bis-(4'-ethoxy-3-methylnaphtha-1':2':4:5-thiazole) β-ethyltrimethincyanine chloride*

This was prepared from 4'-ethoxy-2-methylnaphtha-1':2:4:5-thiazole metho-p-toluenesulfonate, ethyl orthopropionate and pyridine, as in previous examples, followed by treatment with hot ammonium chloride solution. After treatment of the solid product with water and with acetone, it was recrystallized from methyl alcohol.

The corresponding dye bromide was prepared by treating a hot suspension of the chloride (0.95 g.) in spirit (20 cc.) with a hot solution of ammonium bromide (3.8 g.) in 20 cc. of water: solid separated. After boiling, with mechanical stirring, for 5 minutes, the mixture was allowed to cool and the dye filtered off and washed. It was extracted with ether in a Soxhlet apparatus and the residue was boiled out with methyl alcohol and then recrystallized from that solvent. The dark solid gave a bluish purple methyl alcoholic solution, with its absorption maximum at 588 mu. It had a very indefinite M. P. with decomposition, at about 230°.

*Example 5.—Bis-(4'-ethoxy-3:6'-dimethylnaphtha)-1':2':4:5-thiazole) β-ethyltrimethincyanine chloride*

This was prepared from 4'-ethoxy-2:6'-dimethylnaphtha-1':2':4:5-thiazole metho-p-toluenesulfonate, ethyl orthopropionate and pyridine, followed by aqueous ammonium chloride. The product was filtered off when cold, washed with water, ground with acetone, boiled out with absolute ethyl alcohol, and recrystallized twice from that solvent.

*Example 6.—Bis-(4'-methoxy-3-ethylnaphtha-1':2':4:5-thiazole) trimethincyanine bromide*

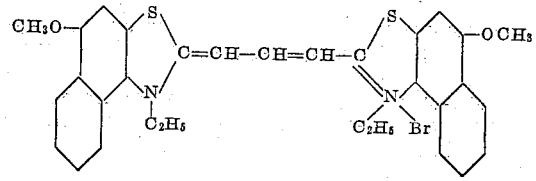

4'-methoxy-2-methylnaphtha-1':2':4:5-thiazole etho-p-toluenesulfonate (8.04 g.; 2 mols.), ethyl orthoformate (4.7 cc.; 3 mols.), and pyridine (35 cc.) were heated together in an oilbath at 145° to 155° for an hour. The intensely blue liquid was added to a hot solution of ammonium chloride (4 g.; 8 mols.) in water (70 cc.) but nothing crystallized on cooling. The liquid was therefore reheated and treated with a hot solution of ammonium bromide (7.4 g.; 8 mols.) in water (100 cc.). Solid separated on cooling and was filtered off, washed with water, boiled out with chloroform, and recrystallized from methyl alcohol.

The indigo-blue crystals, M. P. 246° (decomp.), gave a bluish purple methyl alcoholic solution with its absorption maximum at 610 mu.

*Example 7.—Bis-(4'-ethoxy-3-ethylnaphtha-1':2':4:5-thiazole) trimethincyanine bromide*

This was prepared from 4'-ethoxy-2-methylnaphtha-1':2':4:5-thiazole etho-p-toluenesulfonate, ethyl orthoformate, and pyridine, as in the preceding example. After pouring the hot reaction liquid into hot ammonium chloride solution, dye did separate on cooling and was filtered off and ground with acetone. Subsequently it was converted into the bromide by taking up in hot spirit, treating with hot aqueous ammonium bromide, and boiling and stirring for 5 minutes, prior to cooling and filtration. The solid was extracted with ether in a Soxhlet apparatus and the residue boiled out with methyl alcohol and recrystallized from methyl alcohol. The dark blue dye, M. P. 242° (decomp.), gave a blue methyl alcoholic solution with its absorption maximum at 605 mu.

*Example 8.—Bis-(4'-methoxy - 3 - methylthionaphtheno - 4:5:7':6' - thiazole) β - methyltrimethincyanine p-toluenesulfonate*

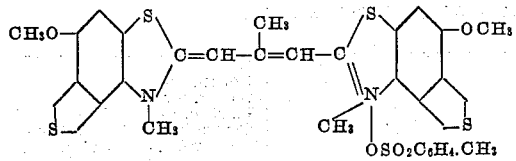

4'-methoxy - 2 - methylthionaphtheno-4:5:7':6'-thiazole metho-p-toluenesulfonate (1.94 g.; 2 mols.), ethyl orthoacetate (1.3 cc.; 3 mols.) and pyridine (20 cc.) were heated at 145° to 155° for an hour. The hot reaction mixture was filtered and the resultant solid was washed successively with pyridine, acetone, and hot spirit. The dark residue, M. P. 306° (decomp.), gave a bluish purple spirit solution. A methyl alcoholic solution had its absorption maximum at 581 mu.

*Example 9.—Bis-(4'-methoxy -3- ethylthionaphtheno-4:5:7':6'-thiazole) β-methyltrimethincyanine p-toluenesulfonate*

This was similarly prepared from 4'-methoxy-2-methylthionaphtheno-4:5:7':6'-thiazole etho-p-toluenesulfonate. The product obtained on filtering the hot reaction mixture was washed with cold pyridine and then recrystallized from pyridine. The steel blue crystals had M. P. 283° (decomp.). A methyl alcoholic solution had its absorption maximum at 585 mu.

The quaternary salts employed in the foregoing examples can be prepared as illustrated in the following examples:

*Example 10.—4'-methoxy-2-methylnaphtha-1':2':4:5-thiazole metho-p-toluenesulfonate*

4'-methoxy -2- methylnaphtha-1':2':4:5-thiazole (5.77 g.; 1 mol.) and methyl-p-toluenesulfonate (4.69 g.; 1 mol.) were heated together in an oilbath at 155° to 165° for 1½ hours. The resultant solid was boiled out three times with benzene (15 cc.×3), the solid being ground after the first extraction. The undissolved residue was filtered off and dried in a vacuum desiccator before use in the dye condensations.

*Example 11.—4'-ethoxy-2-methylnaphtha-1':2':4:5-thiazole metho-p-toluenesulfonate*

Equimolecular quantities of 4'-ethoxy-2-methylnaphtha-1':2':4:5-thiazole and methyl p-toluenesulfonate were heated together as above and the solid product was boiled out with benzene.

*Example 12.—4'-methoxy - 2:6' - dimethylnaphtha-1':2':4:5-thiazole metho-p-toluenesulfonate*

Equimolecular amounts of 4'-methoxy-2:6-dimethylnaphtha-1':2':4:5-thiazole and methyl p-toluenesulfonate were heated together in an oilbath at 155° to 165° for 3 hours. The solid product was boiled out three times with benzene and dried as above.

*Example 13.—4'-ethoxy-2:6-dimethylnaphtha-1':2':4:5-thiazole metho-p-toluenesulfonate*

This was similarly prepared from 4'-ethoxy-2:6'-dimethylnaphtha -1':2':4:5- thiazole and methyl p-toluenesulfonate.

*Example 14.—4'-methoxy-2-methylnaphtha-1':2':4:5-thiazole etho-p-toluenesulfonate*

4'- methoxy-2-methylnaphtha-1':2':4:5-thiazole (6.88 g.; 1 mol.) and ethyl p-toluenesulfonate (6.01 g.; 1 mol.) were heated together for 8 hours in an oilbath at 155° to 165°. The resultant gum was heated with benzene (30 cc.), during which heating it solidified. The solid was filtered off when cold, ground, boiled out twice more with benzene (30 cc.×2) and dried in a vacuum desiccator.

*Example 15.—4' - ethoxy - 2 - methylnaphtha-1':2':4:5-thiazole etho-p-toluenesulfonate*

Equimolecular quantities of 4'-ethoxy-2-methylnaphtha-1':2':4:5-thiazole and ethyl p-toluenesulfonate were heated together in an oilbath at 155° to 165° for 8 hours. Benzene was added to the gum, boiled, and left to cool. Solidification occurred on standing and the solid was filtered off, ground, boiled out twice more with benzene, and dried in a vacuum desiccator.

*Example 16. — 4'-methoxy-2-methylnaphtheno-4:5:7':6'-thiazole metho-p-toluenesulfonate*

4' - methoxy - 2 - methylthionaphtheno - 4:5:7':6'-thiazole (2.35 g.; 1 mol.) and methyl p-toluenesulfonate (1.86 g.; 1 mol.) were heated together for 1 hour in an oilbath at 150° to 155°. The solid was boiled out three times with benzene (15 cc.×3), being ground after the first boiling out.

The heterocyclic bases employed in preparing the foregoing quaternary salts can be prepared as described in the copending application of Edward B. Knott, Serial No. 584,736, filed March 24, 1945, entitled "Production of thiazole and selenazoles with fused-on rings."

As shown in the foregoing examples, the ortho ester is advantageously employed in excess. Usually about two molecular proportions of the ortho ester to one of the quaternary salt is suitable.

Our new dyes (unsubstituted in the trimethine chain) can also be prepared by condensing two molecular proportions of the quaternary salt with about one molecular proportion of a diarylformamidine, e. g. diphenylformamidine, in the presence of an acid-binding agent, such as a mixture of acetic anhydride and sodium acetate. Alkali metal salts of weak inorganic acids can also be used as acid-binding or condensing agents.

Our new dyes containing an alkyl group on the central carbon atom of the trimethine chain can also be prepared by condensing two molecular proportions of the quaternary salt with about one molecular proportion of a carboxylic anhydride containing at least four carbon atoms, in the presence of an acid-binding agent, e. g. sodium acetate, potassium carbonate or trisodium phosphate.

Our new dyes containing an alkyl group on the central carbon atom of the trimethine chain can also be prepared by condensing about two molecular proportions of the quaternary salt with one molecular proportion of a C-alkyl-S-alkyl-(aralkyl- or aryl-)-N-phenyl thioimide, e. g. alkyl isothioacetanilides, in the presence of an acid-binding agent such as those set forth above.

Our new dyes (unsubstituted in the trimethine chain) can also be prepared by condensing about one molecular proportion of glutaconic acid with two molecular proportions of a quaternary salt of the following general formula:

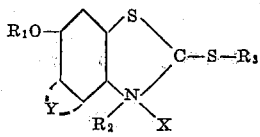

wherein $R_1$ and $R_3$ represent alkyl groups, $R_2$ represents an alkyl or aralkyl group, X represents an anion and Y represents the non-metallic atoms necessary to complete a benzene or thiophene ring, in the presence of an acid-binding agent. Any of the acid-binding agents set forth above can be used. These alkylthio quaternary salts can be prepared as described in the copending application of Edward B. Knott, Serial No. 584,736, filed March 24, 1945, entitled "Production of thiazoles and selenazoles with fused-on rings."

In the preparation of photographic emulsions containing the novel dyes herein described, it is only necessary to disperse the dyes in the emulsions. The methods of incorporating dyes in emulsions are simple and well known to those skilled in the art. It is convenient to add the dyes from solutions in appropriate solvents. Methanol has proved satisfactory as a solvent for our new dyes. Ethyl alcohol or acetone may also be employed where the solubility of the dyes in methanol is lower than desired.

Sensitization by means of the novel dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of the novel dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of the novel dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of the dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that the novel dyes can be incorporated by other methods in many of the photographic silver halide emulsions customarily employed in the art. For instance, the dye may be incorporated by bathing a plate or film upon which an emulsion has been coated, in the solution of the dye, in an appropriate solvent. Bathing methods, however, are not to be preferred ordinarily.

The following table contains data which illustrate the sensitizing effect of several of our new dyes. The dyes were added to a medium fast gelatino-silver-bromiodide emulsion in the usual manner in methyl alcohol solution. The resulting emulsions were coated on glass plates in the usual manner and tested in a sensitometer and on a wedge spectrograph.

| Dye | Concentration (g. per 5 l. of emulsion equivalent to 200 g. of silver nitrate) | Maximum of Spectral Sensitivity, mu. |
| --- | --- | --- |
| Ex. 1 | 0.025 | 570 and 620. |
| Ex. 1 | 0.10 | 680. |
| Ex. 1 | 0.20 | 680. |
| Ex. 1 | [1] 0.10 | 705. |
| Ex. 1 | [1] 0.20 | 705. |
| Ex. 2 | [1] 0.20 | 570 and 620. |
| Ex. 3 | [1] 0.20 | broad 600 to 670. |
| Ex. 4 | [1] 0.20 | 690. |
| Ex. 5 | [1] 0.20 | 680. |
| Ex. 6 | [1] 0.20 | broad 560 to 660. |
| Ex. 7 | [1] 0.20 | broad 560 to 660. |
| Ex. 8 | [1] 0.20 | broad 560 to 660. |
| Ex. 9 | [1] 0.20 | 530+ and 685. |

[1] Emulsion held at 40° C. for 30 minutes after addition of dye.

The introduction of a methoxyl group in the 4'-position of the β-naphthothiazole nucleus resulted in a shift of the maximum sensitization toward the red, but replacement by ethoxyl moved the maximum slightly the other way. Further substitution in the 6'-position with methyl shifted the maximum further toward the green, and the final maximum was less pronounced.

What we claim as our invention and desire to be secured by Letters Patent of the United States is:

1. The trimethine cyanine dyes which can be represented by the following general formula:

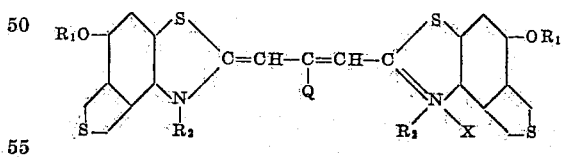

wherein $R_1$ and $R_2$ each represents an alkyl group, Q represents a member selected from the group consisting of a hydrogen atom and an alkyl group and X represents an anion.

2. The trimethine cyanine dyes which can be represented by the following general formula:

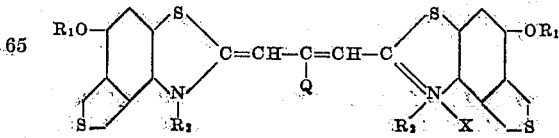

wherein $R_1$ and $R_2$ each represents a primary alkyl group having from 1 to 4 carbon atoms, Q represents a member selected from the group consisting of a hydrogen atom and a primary alkyl group having from 1 to 4 carbon atoms and X represents a halide anion.

3. The trimethine cyanine dye of the following formula:

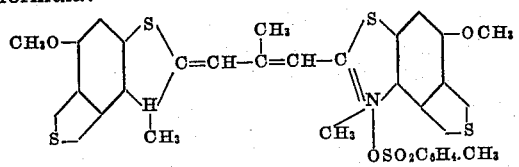

4. The trimethine cyanine dye of the formula:

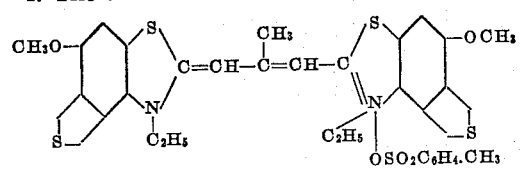

5. The trimethine cyanine dyes which can be represented by the following general formula:

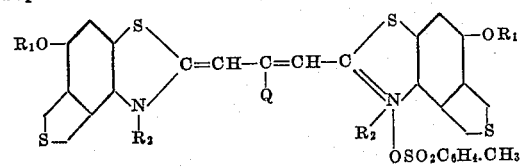

wherein $R_1$ and $R_2$ each represents a primary alkyl group having from 1 to 4 carbon atoms and Q represents a member selected from the group consisting of a hydrogen atom and a primary alkyl group having from 1 to 4 carbon atoms.

FRANCES M. HAMER.
EDWARD B. KNOTT.

REFERENCES CITED

The following references are of record in the file of this patent:

UNITED STATES PATENTS

| Number | Name | Date |
|---|---|---|
| 1,846,300 | Brooker | Feb. 23, 1932 |
| 1,935,696 | Brooker | Nov. 21, 1933 |
| 2,072,908 | Schneider | Mar. 9, 1937 |
| 2,194,213 | Wilmanns | Mar. 19, 1940 |
| 2,206,076 | Carroll | July 2, 1940 |
| 2,218,230 | Carroll | Oct. 15, 1940 |
| 2,313,922 | Carroll | Mar. 16, 1943 |

FOREIGN PATENTS

| Number | Country | Date |
|---|---|---|
| 402,458 | Great Britain | Dec. 4, 1933 |
| 425,609 | Great Britain | 1935 |